Patented Mar. 23, 1943

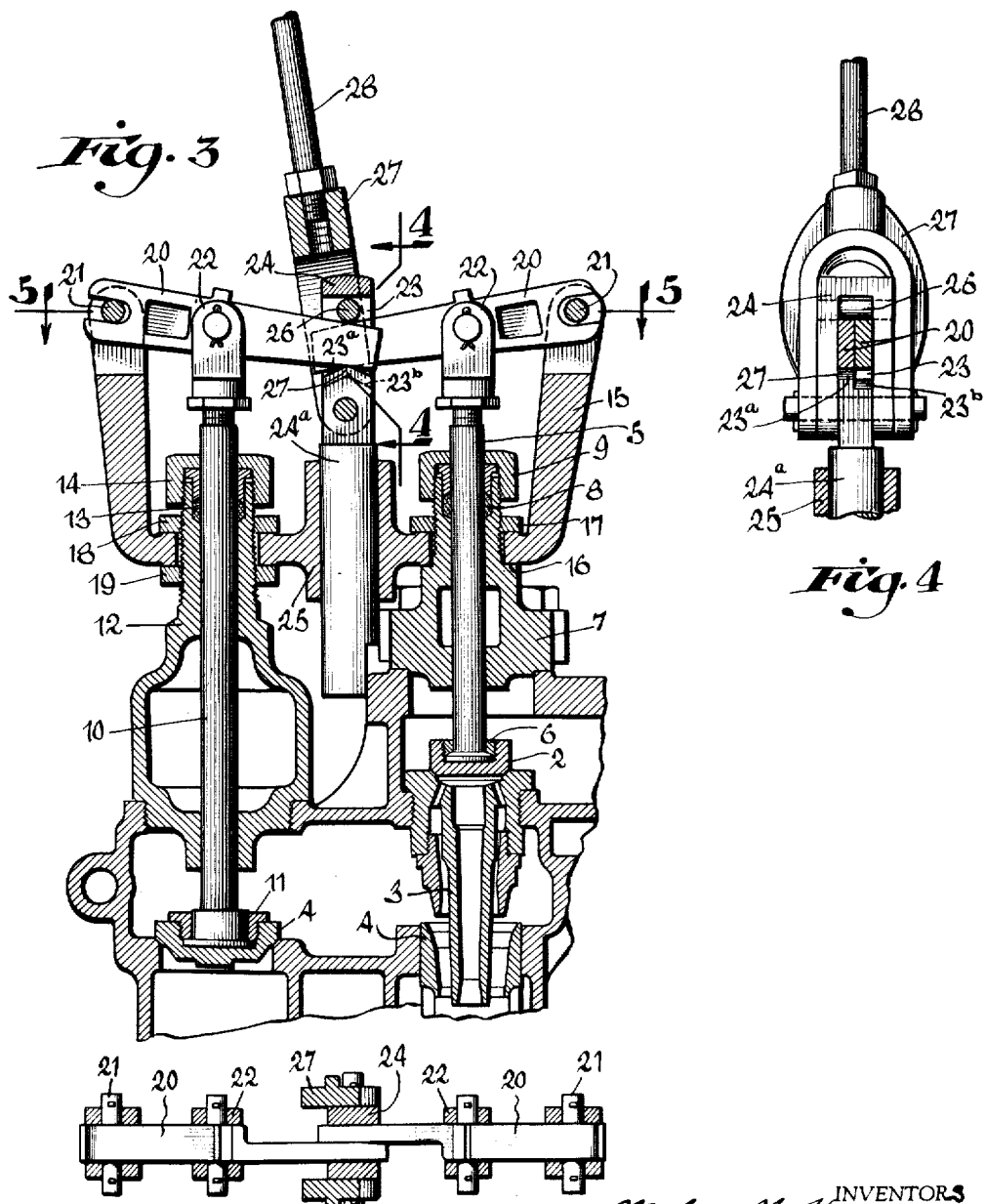

UNITED STATES PATENT OFFICE 2,314,842

2,314,842

SINGLE VALVE GEAR FOR PLURAL VALVE CONTROL

William Norman Hedeman, Cincinnati, and William Earl Snyder, Silverton, Ohio, assignors to The Edna Brass Mfg. Company, Cincinnati, Ohio, a corporation of Ohio Application October 20, 1941, Serial No. 415,728

3 Claims. (Cl. 137—144)

This invention relates to a single lever control for a plurality of valves, particularly for the operation of the water and steam valves of an injector for effecting the injector starting, by opening one valve in advance of the other and continuing in unison to their full open position.

An object of the invention is to provide a single control lever for operating the water and steam valves of a locomotive injector, readily applicable to the conventional and present commercial injectors.

Another object is to provide a single lever actuated valve gear for operating a plurality of valves.

Another object is to provide a lever operated valve gear for controlling a pair or plurality of valves in unison, and imparting a starting movement to one thereof in advance of the other.

Various other features and advantages of the invention will be more fully apparent from a description of the accompanying drawings, in which:

Figure 3 is an enlarged central vertical section through the valve gear of the end portion of an injector to which the valve gear is applicable.

Figure 4 is a section on line 4—4, Figure 3.

Figure 5 is a sectional view taken on line 5—5, Figure 4.

Figures 1, 2:
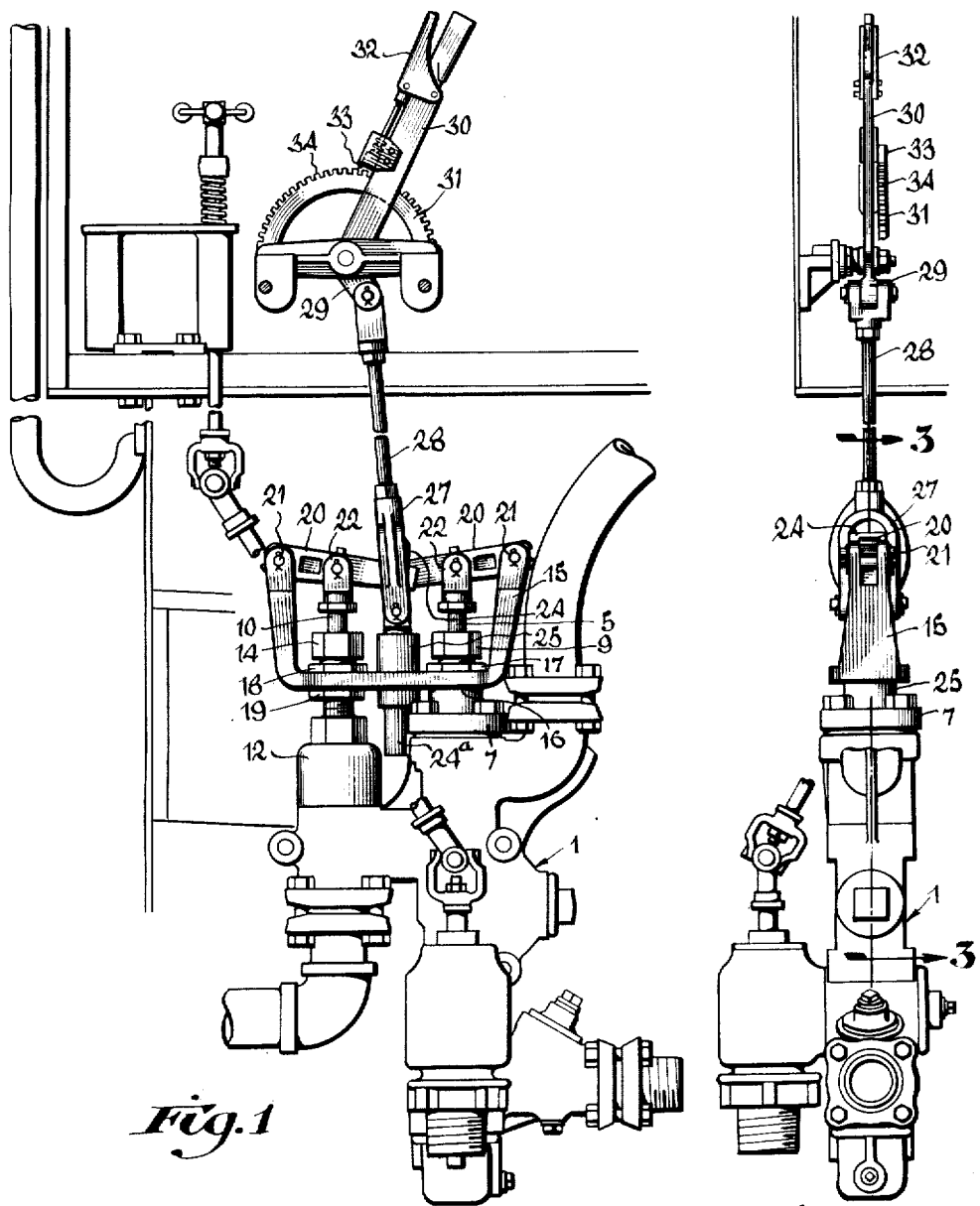
Figure 1 is a side elevation of the improved valve gear in its application to a locomotive injector for operating the water and steam valves thereof.
Figure 2 is an end elevation thereof.

Referring to the drawings, 1 indicates a conventional commercial type of locomotive injector, having a valve 2 for controlling the admission of steam to the injector nozzles 3 and a valve 4 for controlling the admission of water into a chamber in communication with the nozzles, the valves arranged in juxtaposition at the top end of the injector casing.

As the structure of the commercial injectors for locomotive service are well known, and forming no part of the present improvement, extended detail showing and description thereof is not made herein.

The steam valve 2 is shown as of disc type, engaged over a shoulder or head end of a valve rod or stem 5, and secured to the rod by a ring nut 6 engaged about the stem and screw-threaded into the valve. The valve stem 5 is projected through a flanged bonnet 7, covering a valve opening in the injector casing, and secured to the injector casing by several bolts. The flange type of bonnet substitutes the conventional bonnet having a screw-threaded connection with the casing. The upper externally threaded sleeve end of the bonnet includes a stuffing box gland 8 and clamp nut 9 for making a sealing joint about the stem within the bonnet.

The water intake controlling valve 4 for the injector is shown as of disc type engaged over a shoulder or headed end of a stem or rod 10, and secured to the rod by a ring nut 11 engaged about the rod and screw-threaded into the valve. The stem 10 projects through a bonnet 12 having its lower end screw-threaded into the injector casing, and its upper externally threaded sleeved head is provided with a stuffing box including a gland 13 and clamp nut 14.

A valve gear supporting bracket 15 of yoke form is mounted upon the valve bonnets 7 and 12, the base of which is provided with a pair of suitably spaced apertures for respectively receiving therethrough the externally threaded sleeved heads of the bonnets. The bracket rests upon a shoulder 16 of the bonnet 7, and is clamped thereto by a lock nut 17 threaded upon the sleeved head of the bonnet, and for the bonnet 12 is engaged between a pair of lock nuts 18 and 19, screw-threaded upon the sleeved head of said bonnet.

The extremities of the upwardly projecting arms or limbs of the bracket are bifurcated, each to respectively receive and straddle the outer slotted end of an actuating lever 20, one being provided for each valve. The valve levers 20, except for the slotted ends, are of duplicate construction and relatively directed toward each other to bring their inner ends in adjacent overlap. The slotted outer end of each lever engages over a pin 21 fixed in the bifurcated end of the limb of the supporting bracket, and the lever intermediate of its length is pivotally connected to a clevis 22 screw-threaded upon the upper end of the valve stem or rod.

The levers 20, one connecting with the stem of the steam control valve 2, and the second with the water control valve 4, have their inner adjacent ends engaged through an opening 23 in a hinged saddle 24, pivotally connected to the upper end of a guide rod 24ª, slidably mounted within a hub 25 as a part of the supporting bracket 15, the hub being located centrally between the valve stems. The lower wall of the opening 23 through the saddle preferably is stepped or offset to provide a lag increment in the opening movement of one of the valve actuating levers, in the present instance for the steam valve, to permit the water controlling valve 4 to be opened in advance of the steam valve. The stepped surfaces are of tapering form to provide central knife edge contacts with the lower edges of the respective levers 20. The upper edges of the levers 20 contact with a cross pin 26 fixed transversely within the saddle and extending across the opening 23.

The saddle 24 is disposed within a yoke or clevis 27, which, with the saddle, is attached upon the upper end of the guide rod 24ª and to one end of a connecting rod 28. The opposite end of the connecting rod 28 pivotally connects to an arm 29 of a hand lever 30, pivotally mounted upon a quadrant bracket 31 fixed to a suitable support. The hand lever 30 is equipped with a hand latch 32 having a latch pawl 33 engaging with the tooth edge 34 of the quadrant bracket 31. Upon moving the hand lever 30 forward, it will elevate the connecting rod 28 and the saddle 24 for an opening movement of the valves. As there is approximately no lost motion in the connection of the saddle 24 with the lever for controlling the water intake valve 4, there is immediate actuation of the valve upon movement of the hand lever; while for the steam valve, a slight additional opening movement of the lever is required to effect a starting operation due to the stepped condition in the saddle and enlarged slotted condition for establishing a pivotal support or connection for the steam valve actuating lever 20, whereupon, upon continued forward movement of the hand lever 30, the valves are moved simultaneously or in unison to the full open position.

The pivotal connection of the saddle to the guide rod 24ª permits the saddle to swing laterally of its valve actuating movement, and independently of the connecting rod connecting with the hand lever 30 for a self-adjustment of the saddle in its contact with the opposingly directed valve actuating levers 20. The saddle can slip on one of the lever edges until engaged with the second to bring its contact therewith within a crotch formation at the point at which the edges of the levers cross one another for uniformity of action.

In the starting of a lifting movement of the saddle, the water controlling valve 4 is initially or preliminarily opened in advance of the steam valve to a degree controlled by the relative difference in the elevation or rise of the stepped lever contacting edges 23ª and 23ᵇ. When the contact edge 23ᵇ of the saddle engages with the lever 20 for the steam valve, there is a slight additional idling or non-lifting movement of the lever due to the enlargement of the slot in the end of the lever over the diameter of the fulcrum pin 21 to which it anchors before they are brought into a cooperating engagement, after which, both valves are moved in unison to approximately their full open position. The loose fulcrum connection of the lever for the steam valve also serves to relieve the hand lever of any forward surge in opening stroke due to any lifting influence the steam pressure may impose upon the steam valve. This idling allowance between the fulcrum and its lever also effects a slight starting advance of the water controlled valve 4 over the steam valve at the commencement of the closing movement, and further accommodates for an independent movement of the steam valve under the influence of the steam pressure in bringing the valve upon its seat and for a full seating of both valves.

The relative timing for opening and closing one valve in advance of the other, to meet particular requirements, may be modified in degree to permit the hand lever to be left in a particular adjusted position for a desired length of time, so that the attendant can open one valve or vary the duration for which one valve is opened in advance of the other. While the valve gear construction is shown in connection with the operation of a pair of valves of an injector, its use can be extended to other fields, as for fluid systems or apparatus in which it is necessary to change over from one fluid supply to another.

Having described our invention, we claim:

1. A valve gear for unitary operation of the steam and water admission valves of an injector, the valves having their operating stems in parallelism, comprising, a support removably mounted upon the bonnets of the valve, a valve operating lever respectively for each valve extending transversely to and intermediately pivotally connecting with the end of the valve operating stem, one end of the lever fulcrumed on said support, and the opposite end extended to bring the levers for the several valves in an adjoining relation, a saddle in engagement with the free ends of said levers and having a guiding stem pivotally connected with the saddle and slidably mounted on said support, and means pivotally connecting with said saddle to move the same in alternate directions to open and close the valves.

2. A valve gear for unitary operation of the steam and water admission valves of an injector, the valves having their operating stems in parallelism, comprising, a support removably mounted upon the bonnets of the valve, a valve operating lever respectively for each valve extending transversely to and intermediately pivotally connecting with the end of the valve operating stem, one end of the lever fulcrumed on said support, and the opposite end extended to bring the levers for the several valves in an adjoining relation, a saddle in engagement with the free ends of said levers and having a guiding stem pivotally connected with the saddle and slidably mounted on said support, said levers traversing an opening through the saddle, one end of the opening being of stepped formation for actuating one lever in advance of the other initial to imparting unitary movement of the valves in the valve opening direction, and means pivotally connecting with said saddle to move the same in alternate directions to open and close the valves.

3. A valve gear for unitary operation of the steam and water admission valves of an injector, the valves having their operating stems in parallelism, comprising, a support removably mounted upon the bonnets of the valve, a valve operating lever respectively for each valve extending transversely to and intermediately pivotally connecting with the end of the valve operating stem, one end of the lever fulcrumed on said support, and the opposite end extended to bring the levers for the several valves in an adjoining relation, a saddle in engagement with the free ends of said levers and having a guiding stem pivotally connected with the saddle and slidably mounted on said support, said levers traversing an opening through the saddle, one end of the opening being of stepped formation for actuating one lever in advance of the other initial to imparting unitary movement of the valves in the valve opening direction, the lever for the steam valve loosely fulcrumed on said support for affording a slight freedom of valve movement independent of the valve gear control, and means pivotally connecting with said saddle to move the same in alternate directions to open and close the valves.

WILLIAM NORMAN HEDEMAN.
WILLIAM EARL SNYDER.